(12) United States Patent
Nishina et al.

(10) Patent No.: US 7,275,795 B2
(45) Date of Patent: Oct. 2, 2007

(54) BRAKING SYSTEM OF HYBRID VEHICLE

(75) Inventors: Mitsuhiro Nishina, Ageo (JP); Yuuji Suzuki, Ageo (JP); Tatsuji Miyata, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 245 days.

(21) Appl. No.: 10/507,732

(22) PCT Filed: Mar. 20, 2003

(86) PCT No.: PCT/JP03/03436

§ 371 (c)(1),
(2), (4) Date: Mar. 30, 2005

(87) PCT Pub. No.: WO03/078200

PCT Pub. Date: Sep. 25, 2003

(65) Prior Publication Data

US 2005/0218717 A1    Oct. 6, 2005

(30) Foreign Application Priority Data

Mar. 20, 2002 (JP) ............................. 2002-078564

(51) Int. Cl.
    *B60T 8/62* (2006.01)
(52) U.S. Cl. ...................... 303/186; 303/152
(58) Field of Classification Search .............. 303/3, 303/152, 186, 187; 701/22; 180/65.2
    See application file for complete search history.

(56) References Cited

U.S. PATENT DOCUMENTS

| | | | |
|---|---|---|---|
| 5,378,053 A | 1/1995 | Patient et al. | 303/152 |
| 5,632,534 A * | 5/1997 | Knechtges | 303/152 |
| 5,967,621 A * | 10/1999 | Ito et al. | 303/152 |
| 6,120,115 A * | 9/2000 | Manabe | 303/152 |
| 6,325,470 B1 * | 12/2001 | Schneider | 303/152 |
| 6,454,364 B1 * | 9/2002 | Niwa et al. | 303/152 |
| 6,508,523 B2 * | 1/2003 | Yoshino | 303/152 |
| 6,930,405 B2 * | 8/2005 | Gunji | 303/152 |
| 6,988,779 B2 * | 1/2006 | Amanuma et al. | 303/152 |
| 7,077,484 B2 * | 7/2006 | Sasaki et al. | 303/152 |

FOREIGN PATENT DOCUMENTS

| | | |
|---|---|---|
| JP | 05-161209 | 6/1993 |
| JP | 09-099820 | 4/1997 |
| JP | 09-104333 | 4/1997 |

(Continued)

*Primary Examiner*—Thomas Williams
(74) *Attorney, Agent, or Firm*—Rabin & Berdo, PC

(57) ABSTRACT

A hybrid system for a vehicle which can ensure a braking stability on a slippery road is provided. Therefore, the system is provided with a motor 2 a rotation force of which is transmitted to a rear wheel 7, braking actuators 57, 67 which brake the front wheel 6 and the rear wheel 7, and proportional valves 53, 63 controlling a braking force introduced into each braking actuator 57, 67. A control unit 20 is so provided that the control unit 20 calculates a required braking energy based upon a vehicle operating condition in demanding a braking and operates the motor 2 as a power generator to generate a power so as to produce the calculated braking energy, as well as controls a braking force of the front wheel 6.

6 Claims, 13 Drawing Sheets

FOREIGN PATENT DOCUMENTS

| | | |
|---|---|---|
| JP | 10-236300 | 9/1998 |
| JP | 11-055806 | 2/1999 |
| JP | 11-275708 | 10/1999 |
| JP | 11-308703 | 11/1999 |
| JP | 2000-344078 | 12/2000 |

* cited by examiner

FIG. 5
(a)
BRAKE SHARING PATTERN DIAGRAM BEFOR IMPROVEMENT
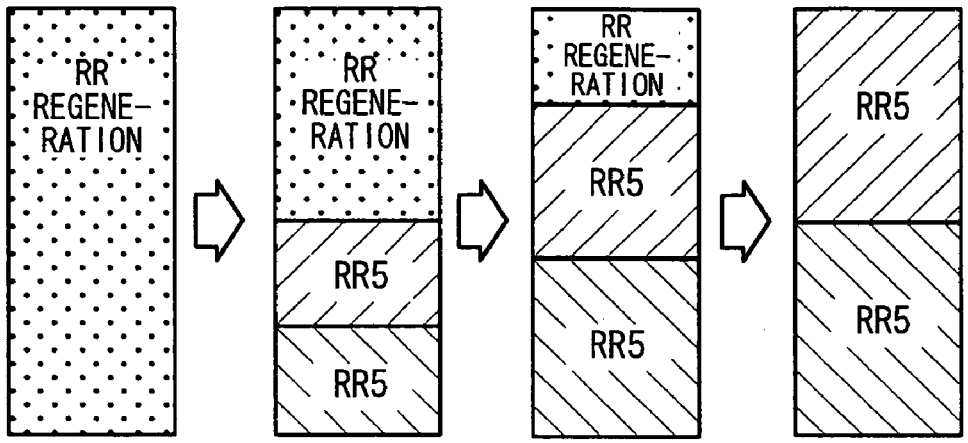
ABS frequently operates due to a strong braking force to RR.
(b)
BRAKE SHARING PATTERN DIAGRAM AFTER IMPROVEMENT
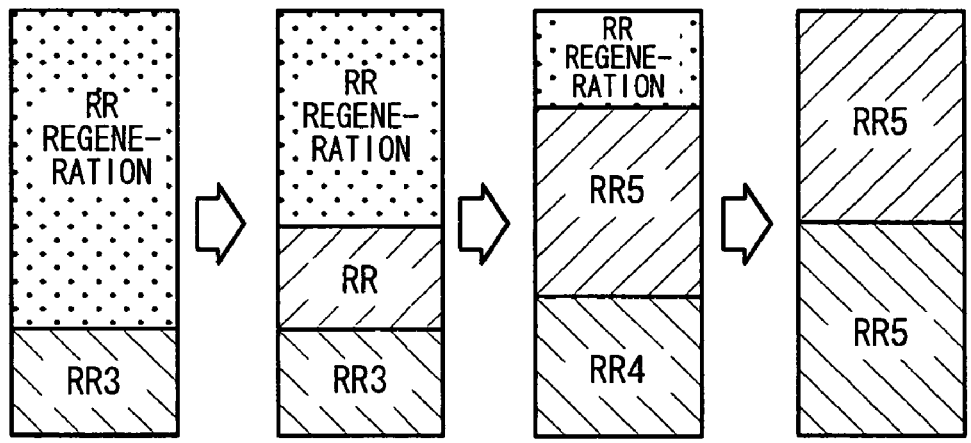
Distribute FR and RR in a ratio of 3 : 7.
Increase a pressure in FR when RR pressure reaches more than 50 %. Return to a ratio of 5 : 5 on vehicle stop.

BRAKING SYSTEM OF HYBRID VEHICLE

TECHNICAL FIELD

The present invention relates to an improvement of a braking system for a hybrid vehicle which selectively switches an engine and an electric-powered motor as a power source of a vehicle.

BACKGROUND INFORMATION

There is a known hybrid vehicle disclosed by Japanese Unexamined Patent Publication No. 2000-332963A which is equipped with a motor connected to an output shaft of an engine where an electric power is supplied to the motor during vehicle acceleration and operates as an electric generator during vehicle deceleration and vehicle braking for performing regenerative braking, and an accumulator is charged with a generated electric power.

However, in case in such a known hybrid vehicle, during a main braking demand when a braking pedal is depressed, almost all of braking forces required are supplied by a regenerative braking based upon prioritizing the regenerative power of a motor, or the motor is operated to generate a regenerative power and at the same time a driving wheel is braked, a braking force of the driving wheel increases extensively. As a result, when a vehicle travels on a slippery road such as a frozen road, the driving wheels slip, to lose vehicle stability during vehicle braking.

An object of the present invention is to provide a braking system for a hybrid vehicle which ensures stability of vehicle braking during vehicle traveling on a slippery road.

SUMMARY OF THE INVENTION

The present invention is provided with a hybrid vehicle including an engine, a motor, and an accumulator to accumulate an electric power which drives the motor comprising a vehicle driving wheel to which rotation of the motor is transmitted, a vehicle driven wheel, a braking actuator which brakes the driving and driven wheels, a control device which changes a braking force of the braking actuator respectively for the driving and driven wheels, and a controller for braking. The controller calculates a braking energy required based upon a vehicle operating condition in demanding a braking and performs the motor to generate a regenerative power so as to produce the calculated braking energy, as well as controls the braking force of the driven wheel.

The required braking force in demanding the braking is obtained by the regenerative power of the motor connected to the driving wheel, and a driving force by the braking actuator which brakes the driven wheel, which prevents the braking force of a driving wheel side from being excessive, thereby to carry out a stable braking performance on vehicle travel conditions such as a frozen road on which a vehicle tends to slip.

BRIEF EXPLANATION OF THE DRAWINGS

FIG. 5 is a pattern diagram showing a relation of a braking force distribution of the embodiment.

PREFERRED EMBODIMENT OF THE INVENTION

A preferred embodiment of the present invention will be explained with reference to accompanying drawings as follows.

Figure 1:
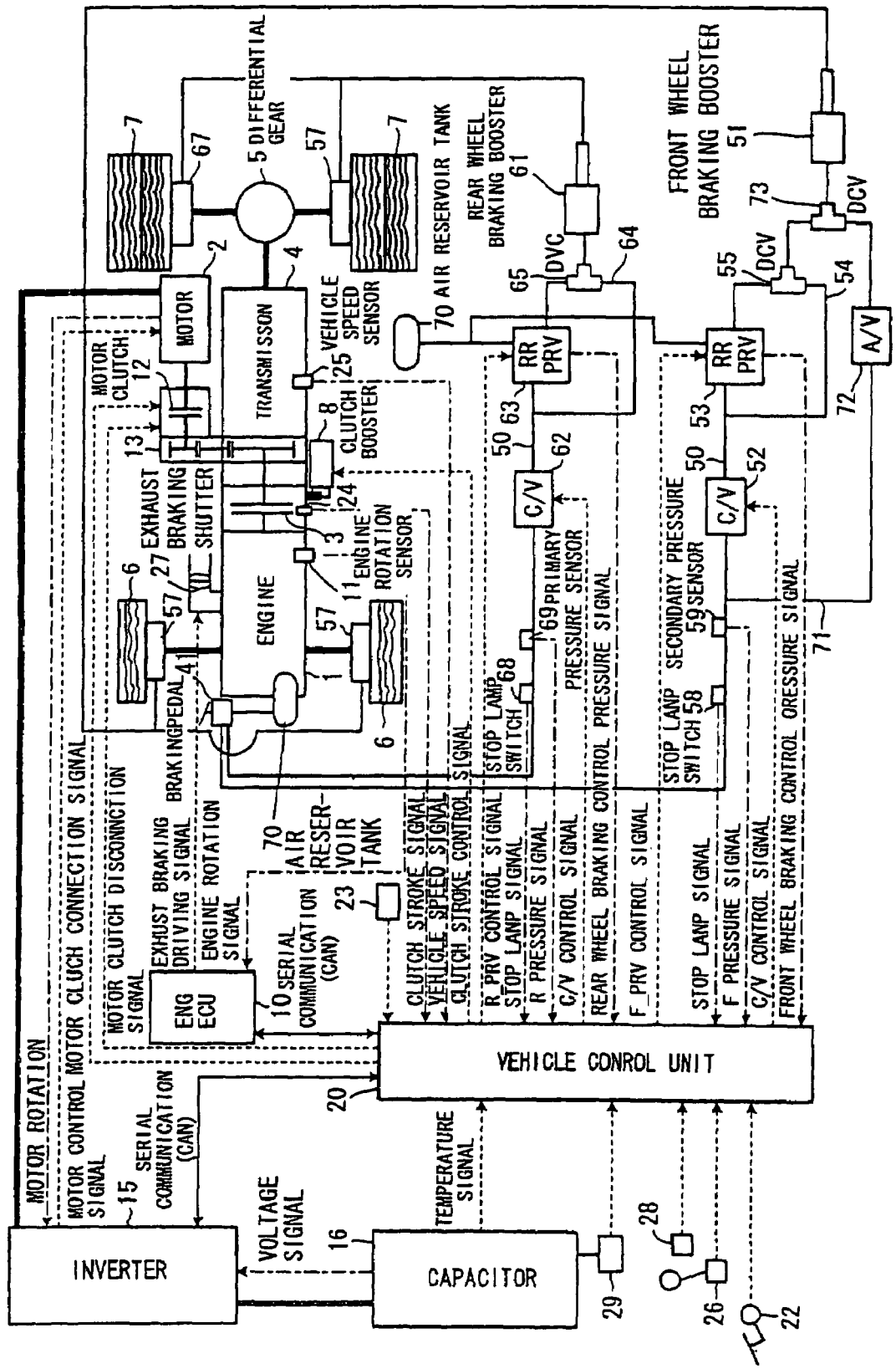
FIG. 1 is a system construction view showing a schematic construction of an embodiment according to the present invention.

As shown in FIG. 1, a power train of a vehicle is provided with an engine 1, an engine clutch 3, and a transmission 4. An output of the engine 1 is transmitted to an input shaft of the transmission 4 through the engine clutch 3, and a rotation of an output shaft of the transmission 4 is transmitted through a propeller shaft, a differential gear 5 and a drive shaft to a right side and left side rear wheels (driving wheel) 7.

The engine 1 is an internal combustion engine which burns fuel to be supplied inside a cylinder and rotates/drives an output shaft of the engine 1 by a reciprocal movement of a piston in the cylinder.

An engine control unit 10 is provided for controlling the output of the engine 1, and controls a fuel supply amount based upon a detecting signal of an engine rotation sensor 13 or various control signals from a vehicle control unit 20 to be described later to adjust the output of the engine 1.

Figure 4:
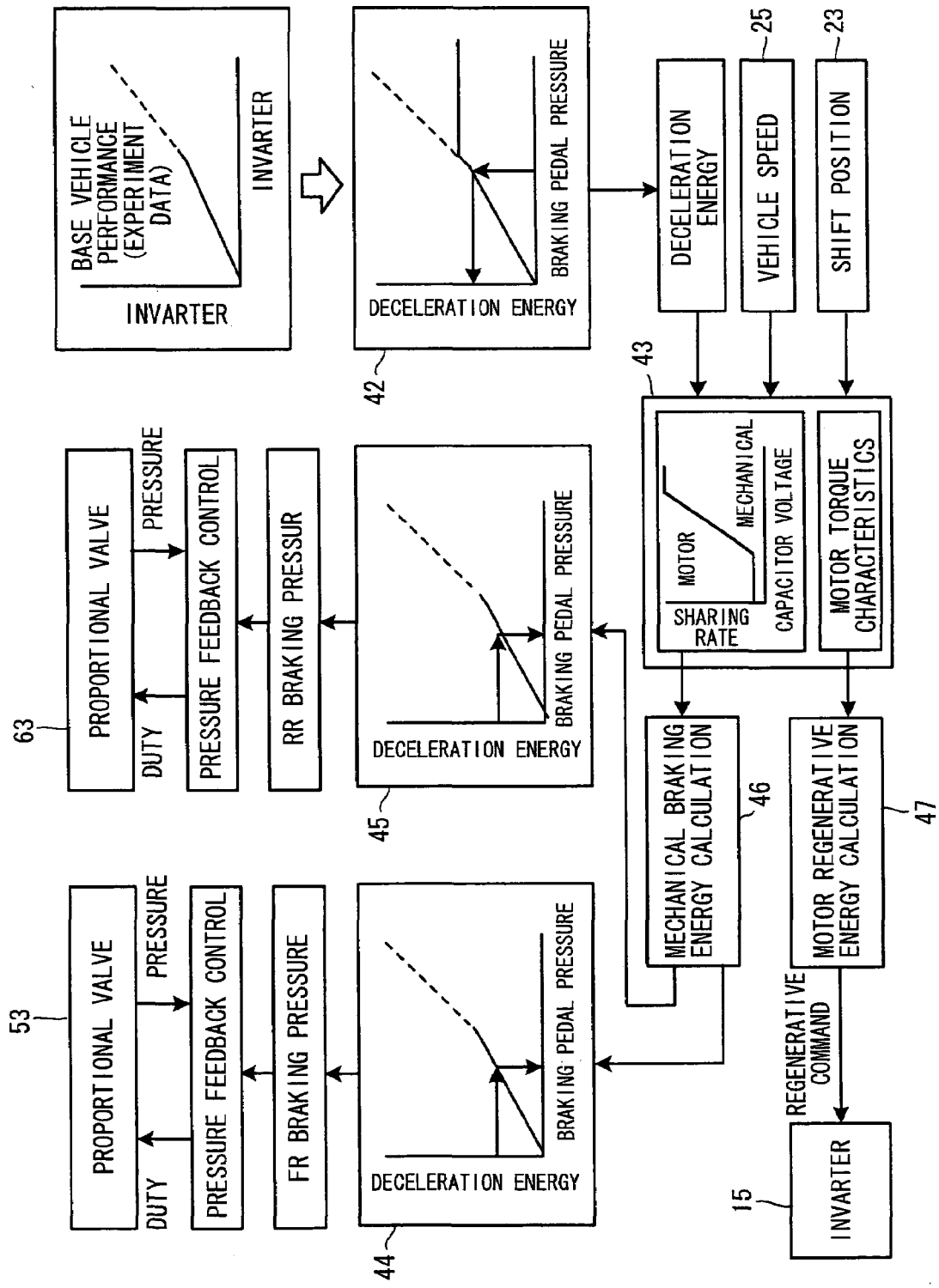
FIG. 4 is a schematic view showing a control concept of the embodiment.

The engine clutch 3 performs connection and disconnection between the engine output shaft and the transmission input shaft through a clutch booster 8. The clutch booster 8, as shown in FIG. 4, disconnects the engine clutch 3 by pressurized air introduced from a clutch actuator 18 by switching a clutch valve 19, and connects the engine clutch 3 by communicating the clutch valve 19 to an open air.

Due to connection of the engine clutch 3 the engine output is transmitted to the transmission 4 to drive rear wheels 7.

Further, a power train of the vehicle is provided with a motor 2, a motor clutch 12, and a gear device 13 where a rotation of the motor 2 is transmitted to the transmission input shaft through the motor clutch 12 and the gear device 13.

The motor 2 is an alternator such as a three-phase synchronous motor or a three-phase induction motor and is driven by an inverter 15. And the motor 2 operates as a power generator by the inverter 15 during vehicle deceleration and performs a regenerative power generation.

The inverter 15 is connected to an electric double layered capacitor 16 as a power accumulator and converts a DC charge power of the capacitor 16 into an AC power, which is supplied to the motor 2, as well as converts an AC power of the motor 2 into a DC power, which charges the capacitor 16.

However, the accumulator is not limited to the capacitor 16, but may be various batteries using a chemical reaction. And the motor 2 may be driven by a DC/DC converter using a DC generator, not limited to the alternator.

A braking system mounted on a vehicle is equipped with a braking valve 41 operated by a driver to adjust a braking air pressure, and the braking valve 41 generates the braking air pressure for front and rear wheels. The braking valve 41 is provided with a front wheel braking pressure passage 50 introducing the braking air pressure for the front wheel into a front wheel braking booster 51, and a rear wheel braking pressure passage 60 introducing the braking air pressure for the rear wheel into a rear wheel braking booster 61.

The braking valve 41 generates a front wheel-side braking pressure and a rear wheel-side braking pressure each in response to a depressed amount of a braking pedal by a driver.

Along the way of the rear wheel braking pressure passage 60 are interposed a cutting valve 62 cutting off the braking air pressure for the rear wheel in the braking valve 41, and a proportional valve 63 adjusting the braking air pressure based upon a command from the vehicle control unit 20 to be described later. And a bypass passage 64 introducing the braking air pressure of the braking valve 41 to the rear wheel braking booster 61 by bypassing the proportional valve 63 is provided, and a double check valve 65 selects a higher pressure out of a pressure introduced from the proportional valve 63 and a pressure introduced from the bypass passage 64, and introduces the selected pressure to the rear wheel braking booster 61 is provided.

It is to be noted that in FIG. 1, a reservoir tank 70 is an air pressure source for the braking valve 41 and the proportional valves 53, 63.

And along the halfway of the front wheel braking pressure passage 50, a cutting valve 52 to block a braking air pressure for the front wheel of the braking valve 41 and a proportional valve 53 to adjust the braking air pressure based upon a command of the vehicle control unit 20 are interposed. And a bypass passage 54 introducing the braking air pressure of the braking valve 41 to the front wheel brake booster 51 by bypassing the proportional valve 53 is provided, and a double check valve 55 selects a higher pressure out of a pressure introduced from the proportional valve 53 and a pressure introduced from the bypass passage 54 and introduces the selected pressure to the front wheel braking booster 51 is provided.

The braking boosters 51, 61 convert the braking air pressure introduced from the braking valve 41 or the proportional valves 53, 63 into a braking oil pressure and operate a front-side braking actuator 57 and a rear-side braking actuator 67 through an ABS (anti braking system) modulator (not shown) to apply a braking force to the front wheels (driven wheels) 6 and the rear wheels 7. The ABS modulator connects/disconnects a braking oil pressure introduced into each braking actuator 57, 67 to make a slip rate of each wheel 6, 7 be closer to a target value in barking a vehicle, whereby the braking pressure is weakened on occurrence of a wheel slip to reduce the wheel slip.

At a manual braking control time when each braking booster 51, 61 operate by the braking air pressure of the braking valve 41 generated based upon a braking operation by a driver, the cutting valves 52, 62 are opened based upon a command from the vehicle control unit 20 and the braking pressure of the braking valve 41 is introduced into each braking booster 51, 61.

On the other hand, at an automatic braking control time a braking air pressure controlled by the proportional valves 53, 63 based upon a command from the vehicle control unit 20 is introduced into each braking booster 51, 61 and at this moment the cutting valves 52, 62 are closed.

The proportional valve 53, 63 is formed of an electromagnetic proportional flow control valve an opening aperture of which is feedback-controlled in response to a duty signal from the vehicle control unit 20. On the other hand, the cutting valve 52, 62 is formed of an electromagnetic valve which opens/closes by on/off signals from the vehicle control unit 20.

And a front wheel-side braking circuit is provided with a backup passage 71 to introduce the braking air pressure of the braking valve 41 into the front wheel braking booster 51 by bypassing the cutting valve 52 and the proportional valve 53, an adaptor valve 72 which opens the backup circuit 71 as the braking air pressure of the braking valve 41 exceeds a predetermined value, and a double check valve 73 which selects a higher pressure out of the pressure introduced from the proportional valve 53 and the pressure introduced from the backup passage 71 and introduces the selected pressure into the front wheel braking booster 51.

The adaptor valve 72 is adapted to open the backup passage 71 as the braking air pressure of the braking valve 41 exceeds a predetermined value. The adaptor valve 72 blocks the backup passage 71 in a state where the braking pedal is not depressed by a driver extensively, and on the other hand, as the braking pedal is depressed extensively, opens the backup passage 71 to introduce the braking air pressure of the braking valve 41 into the front wheel booster 51. Thereby just in case a control system of the vehicle control unit 20 fails, the braking air pressure of the braking valve 41 is introduced through the adaptor valve 72 into the front wheel braking booster 51 to perform a failsafe function by braking the front wheels 6.

Independently of the above-described vehicle braking system, an exhaust brake 27 is disposed as a supplementary brake. In the exhaust brake 27, an exhaust shutter is interposed in an exhaust passage where the exhaust shutter is closed to increase an exhaust gas pressure, thereby to increase an engine braking force.

An engine control unit 10, when an exhaust braking switch 26 becomes on by an operation of the switch 26 by a driver, closes the exhaust shutter based upon a control signal required from the vehicle control unit 20 to operate the exhaust brake 27.

Further, a supplementary brake may be, for example, a compression pressure opened-type brake to open an exhaust valve for an engine during an intake stroke or other mechanisms besides a device to increase an engine braking force.

The vehicle control unit 20 receives an input of information from the engine control unit 10 and the inverter 15, as well as receives inputs of each signal from an emergency switch 28, an exhaust braking switch 26, accelerator opening angle sensor 22 to detect an acceleration pedal' depressing amount, a stroke sensor 24 to detect a stroke amount of the engine clutch 3, a gear position sensor 23 to detect a gear position of the transmission 4, a vehicle speed sensor 25 to detect a vehicle speed, a voltage sensor 29 to detect a charging state of a capacitor 16, stop lamps 58, 68 disposed in braking pressure passages 50, 60 to switch on/off in response to a braking pressure therein, and braking force sensors 59, 69 to detect the braking pressure. The vehicle control unit 20 controls connection/disconnection of the engine clutch 3 and connection/disconnection of the motor clutch 12 in response to an engine operating condition determined based upon these signals, and further, controls an output of the engine 1 and an output of the motor 2, as well as a braking force by the braking system together.

Further, the emergency switch 28 switches an activation and a stop of the system by an operation of a driver, and in case a malfunction with regard to the system occurs, the emergency switch 28 stops the control system of the vehicle control unit 20, and in particular returns an automatic control of the control system back to a manual control.

Herein braking control operations of the vehicle control unit 20 are performed separately during vehicle coasting, in an exhaust braking demand, in a main braking demand, and in both an exhaust brake 27 and a main braking demand as below.

1) A coasting time is judged based upon the following condition.
   A) When an accelerator is off where a depressing amount of an acceleration pedal is less than a predetermined value.
   B) When an exhaust braking is off where the exhaust braking switch 26 is off.
   C) When a main braking is off where a depressing amount of the braking pedal is less than a predetermined value.

In case the coasting time is judged, the engine clutch 3 is disconnected and the motor clutch 12 is connected, whereby an AC power of the motor 2 performing a regenerative power generation is controlled through the inverter 15 to generate a power equivalent to a braking force of the engine braking (friction of the engine 1).

On the other hand, when a charging pressure of the capacitor 16 exceeds a predetermined value, the motor clutch 12 is disconnected and the engine clutch 13 is connected, whereby the braking is performed only by the friction of the engine 1.

2) The exhaust braking demand time is judged by the following condition.
   A) When an accelerator is off where a depressing amount of an acceleration pedal is less than a predetermined value.
   B) When an exhaust braking is on where the exhaust braking switch 26 is on.
   C) When a main braking is off.

In case the exhaust braking demand is judged, the engine clutch 3 is connected, the exhaust shutter is opened and the motor clutch 12 is connected, whereby an AC power of the motor 2 performing a regenerative power generation is controlled to generate a power equivalent to a braking force of the exhaust brake 27.

On the other hand, when a charging pressure of the capacitor 16 exceeds a predetermined value, the motor clutch 12 is disconnected and the exhaust shutter is closed, whereby the braking is performed only by the engine braking.

3) The main braking demand is judged by the following condition.
   A) When an accelerator is off.
   B) When an exhaust braking is off.
   C) When a main braking is on where a depressing amount of the braking pedal exceeds a predetermined value.

In case the main braking demand time is judged, the engine clutch 3 is disconnected, the exhaust shutter is opened and the motor clutch 12 is connected, whereby an AC power of the motor 2 performing a regenerative power generation is controlled to generate a power equivalent to a braking force determined based upon a preset map, as well as the remaining engine braking is performed by each braking actuator 57, 67 based upon an operation of each proportional valve 53, 63.

In this case, as described later in particular, during an initial braking time a braking force is generated in the front wheels only, not in the rear wheels and the required braking energy is generated by the regenerative power generation by the motor 2 and the front wheel-side braking force.

On the other hand, when the charging voltage of the capacitor 16 exceeds a predetermined value, the motor clutch 12 is disconnected and the braking is performed only by each braking actuator 57, 67.

4) Both the exhaust brake 27 and the main braking demand are judged based upon the following condition.
   A) When an accelerator is off.
   B) When an exhaust braking is on.
   C) When a main braking is on.

In case the exhaust brake 27 and the main braking demand time are judged, the engine clutch 3 is connected, the exhaust shutter is opened and the motor clutch 12 is connected, whereby an AC power of the motor 2 performing a regenerative power generation is controlled to generate a power equivalent to a braking force determined based upon a preset map, as well as the remaining engine braking is performed by each braking actuator 57, 67 based upon an operation of each proportional valve 53, 63. In this case, as in the case of the main braking demand time of 3), the required braking energies are controlled to be generated by the front wheel-side braking force and the regenerative power generation of the motor 2.

On the other hand, when a charging voltage of the capacitor 16 exceeds a predetermined value, the motor clutch 12 is disconnected and the exhaust shutter is closed, whereby the braking is performed by the engine braking and each braking actuator 57, 67.

Figure 2:
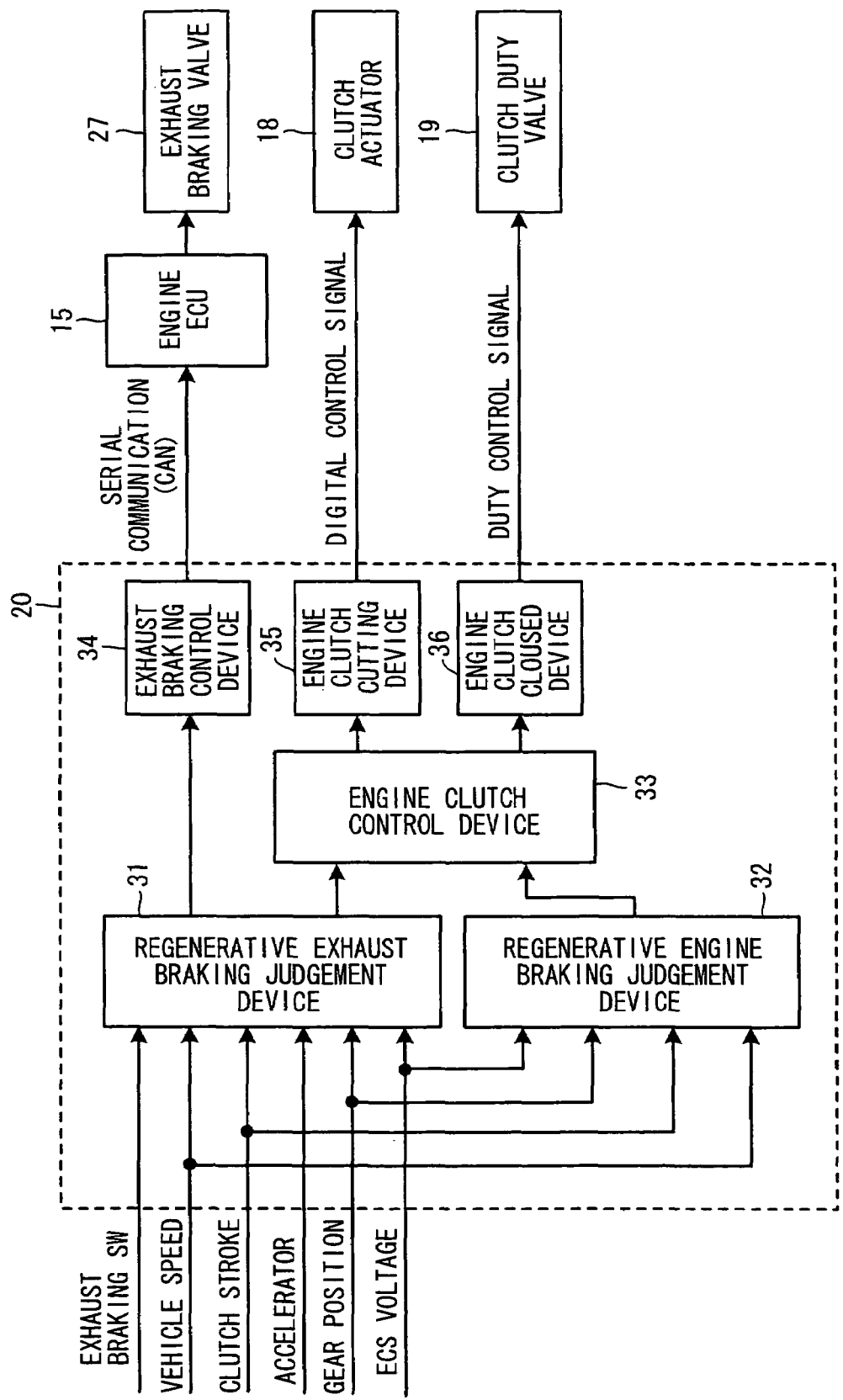
FIG. 2 is a block diagram showing control contents of the embodiment.

FIG. 2 is a control block diagram to perform controls of 1) and 2) out of the above-described braking controls.

The vehicle control unit 20 is provided with a circuit section 31 to judge a regenerative exhaust braking time when the exhaust braking switch 26 is on (exhaust braking demand time), and a circuit section 32 to judge a regenerative engine braking time when the exhaust braking switch 26 is off. Therefore, each of these circuit sections 31, 32 receives inputs of the detecting signals from the exhaust braking switch 26, the vehicle speed sensor 25, the clutch stroke sensor 24, the acceleration pedal' opening angle sensor 22, the gear position sensor 23, and the ECS voltage (capacitor voltage) sensor 29 or the like.

A circuit section 33 controls connection/disconnection of the engine clutch 3 based upon an output from the circuit sections 31, 32 and further, an engine clutch cutting circuit 35 for an operation control of a clutch actuator 18 to be operated based upon control signals from each circuit, an engine clutch closed circuit 36 for an operation control of a clutch valve 19, and a circuit section 34 to control an operation of an exhaust braking are provided.

Figure 3:
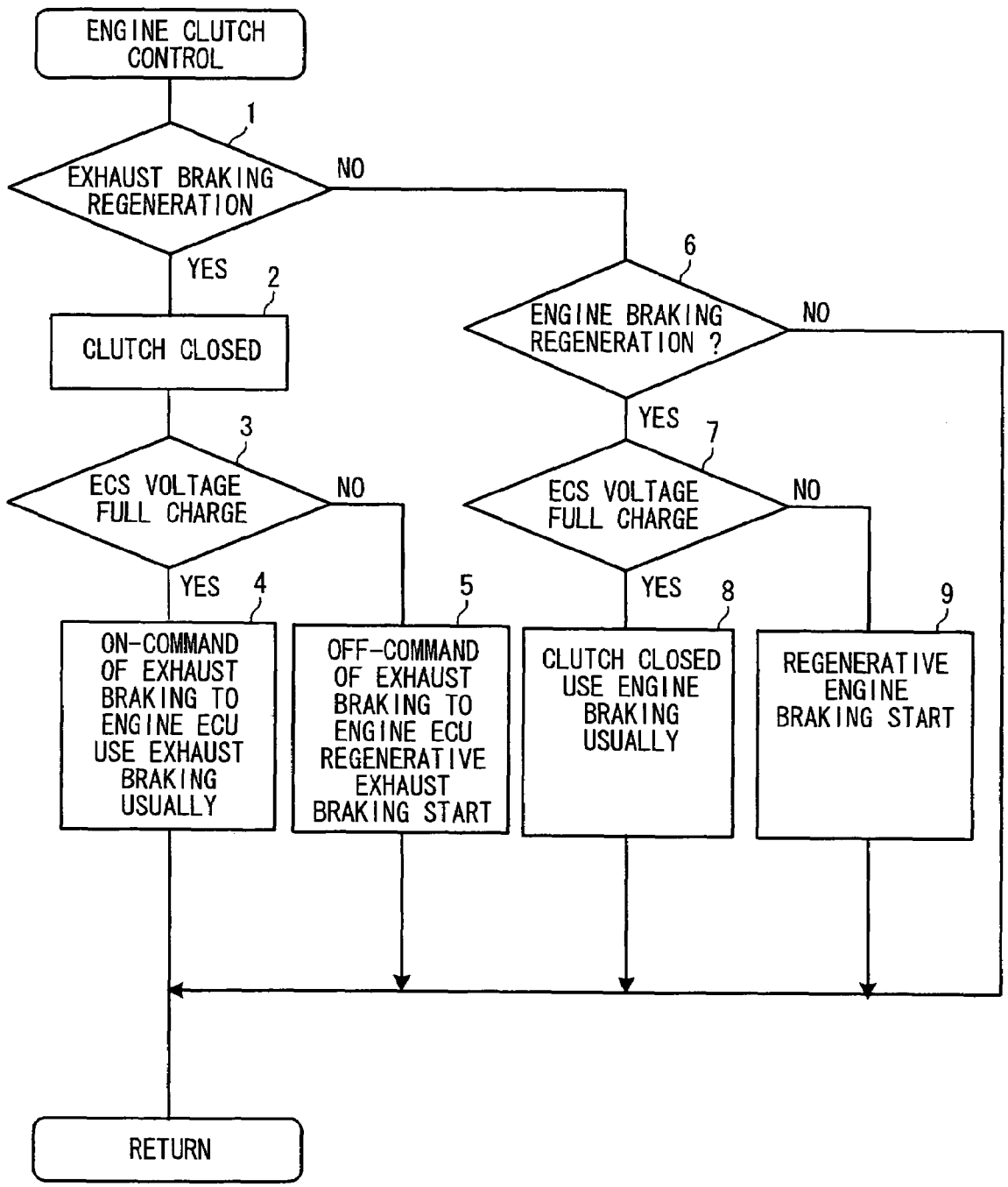
FIG. 3 is a flow chart showing control contents of the embodiment.

A flow chart in FIG. 3 shows a control routine of the above-described braking controls which are performed by the vehicle control unit 20.

With this routine, firstly in step 1, when an exhaust braking regenerative time, namely the exhaust braking switch 26 is on, is judged, the process goes to step 2, wherein the engine clutch is connected and then in step 3, it is judged whether or not a charging voltage of the capacitor 16 is in a full charging state exceeding a predetermined value.

When it is judged that the charging voltage is in a full charging state, the process goes to step 4, wherein the engine control unit 20 issues a command to operate the exhaust brake 27. On the other hand, when it is judged that it is not in a full charging state, the process goes to step 5, wherein the engine control unit 10 switches off the exhaust brake 27 and makes the motor 2 generate the regenerative power, whereby the braking force the same as the exhaust brake 27 is generated.

When it is judged in step 1 that it is not the exhaust braking regenerative time, the process goes to step 6, wherein it is judged whether or not it is an engine braking regenerative time.

Herein when the exhaust braking switch 26 is off, and also it is judged that a vehicle is during vehicle deceleration and in a coasting time, it is determined that it is the engine braking regenerative time.

In this case, the process goes to step 7, wherein it is judged whether or not a charging voltage of the capacitor 16 is in a full charging state exceeding a predetermined value.

When it judged that it is in a full charging state in step 7, the process goes to step 8, wherein the engine control unit 10 connects the engine clutch 3 to generate what is called an engine braking by the engine 1.

On the other hand, when it is judged that in step 7 it is not in a full charging state, the process goes to step 9, wherein the regenerative power generation is performed by the motor 2.

Thus even in an exhaust braking demand time when the exhaust braking switch 26 is on, the motor 2 performs the regenerative power generation without an operation of the exhaust brake 27 and thereby a power corresponding to the braking energy of the exhaust brake 27 is regenerated and a kinetic energy of a vehicle can be effectively recovered.

And even in a case other than the exhaust braking demand time, such as in a case of an engine braking demand like a coasting time, the motor 2 can regenerate a power of braking energy corresponding to an engine braking.

This can reduce a share in braking force of a main braking, to provide sufficient capability of the braking force including a main braking. Further, at an engine braking by this motor 2, it is possible to stop a fuel supply to the engine 1 to improve a fuel economy of the engine 1.

Next, with regard to the main braking demands of 3) and 4) for the above-described braking control operations, a braking system which divides the braking force into the regenerative braking force of the motor 2 and the braking force of each braking actuator 57, 67 will be explained.

First FIG. 4 is an explanatory view showing a concept of a braking system, which will be explained. A relation between a braking pedal pressure and a deceleration is determined based upon experiment data, and based upon this relation, a map 42 setting a relation between a braking pedal pressure and a deceleration energy of a vehicle is set.

A demand deceleration energy is determined in response to a braking pedal pressure detected by braking pressure sensors 59, 69 using the map 42.

A braking sharing ratio and a regenerative braking characteristic are selected based upon the demand deceleration energy, a shift position of the transmission 4 detected by a gear position sensor 23, a vehicle speed detected by a vehicle speed sensor 25, a torque characteristic of the motor 2, and a state of charge of the capacitor 16 with reference to a map 43 in which a sharing ratio of the regenerative braking force of the motor 2 and the braking force of each braking actuator 57, 67 is set.

And a deceleration energy that the front wheel-side braking actuator 57 and the rear wheel-side actuator 67 share is calculated based upon the braking sharing ratio in a calculation section 46. The front wheel braking pressure and the rear wheel braking pressure are determined based upon the calculation result with reference to the preset maps 44, 45, and an operation of each proportional valve (braking pressure adjustment mechanism) 53, 63 is feedback-controlled for obtaining the above braking pressure.

On the other hand, the regenerative energy of the motor 2 is calculated from the regenerative braking force determined from the map 43 in a calculation section 47 and an output command is given to the inverter 15 for obtaining the regenerative energy. Thereby the regenerative power generation is performed by the motor 2.

In addition, as shown in FIG. 5A, in case the demand braking force is generated nearly by the regenerative braking of the motor 2 with a priority of the regenerative power generation of the motor 2 to produce the required deceleration energy at a main braking demand when the braking pedal is depressed, a vehicle stability is deteriorated when the vehicle is running on a slippery road such as a frozen road because of a strong braking force of the rear wheel 7, and as a result, an ABS modulator more frequently operates.

FIG. 5A shows that a vehicle speed reduces from a high value as viewed from the left side to the right side, and finally the vehicle stops.

In this figure, when the main braking demand occurs, since the vehicle speed is high, all required deceleration energies can be covered by the regenerative power generation (RR regeneration) of the motor 2. As the vehicle speed is reduced, the motor regenerative energies reduce and as a result, the braking energies become insufficient on the whole. Therefore, the front wheel-side and rear wheel-side braking force (FR and RR) are adapted to be operated. And when the vehicle stops, the motor regenerative energies come to zero and the front wheel-side and the rear wheel-side braking force only are applied.

However, as described above, during an initial period of the braking, the braking force generated by the regenerative power by the rear wheel-side motor 2 becomes excessively large, to deteriorate a braking stability on a slippery road.

Accordingly in the present invention, as shown in FIG. 5B, a braking force by the braking actuator 57 and a regenerative braking force of the motor 2 are controlled to be distributed so that at a main braking demand when the braking pedal is depressed, the required deceleration energies are obtained by the braking force of the front wheel 6 generated by the braking actuator 57 and the braking force generated by the regenerative power of the motor 2, which are distributed in a ratio of substantially 3 to 7. In this initial period of the braking the braking by the rear wheel-side braking actuator 67 does not start immediately.

Herein a distribution ratio of the braking force applied to the front wheel 6 and the rear wheel 7 is substantially 3 to 7, which is a value as a limit value within which the ABS modulator does not operate when the braking is performed with a deceleration of 0.4 G on a road surface having a friction coefficient of 0.1μ.

Thus since at a main braking demand, a ratio of the braking force applied to the front wheel 6 and the rear wheel 7 is substantially 3 to 7 during vehicle traveling, a braking stability is ensured even when a vehicle travels on a slippery road such as a frozen road, to reduce an operation frequency of the ABS modulator.

It is to be noted that as the regenerative energy by the motor 2 reduces and as a result the above distribution ratio can not be maintained, the distribution control of the braking force is supplemented by the braking actuator 67 of the rear wheel 7. Namely the braking force is generated also by the braking actuator 67 of the rear wheel 7, and thereby when the regenerative energy of the motor 2 gradually reduces during vehicle deceleration, the braking force by the braking actuator 67 ensures the deceleration energy as a whole to maintain a stable braking performance.

Figure 6:
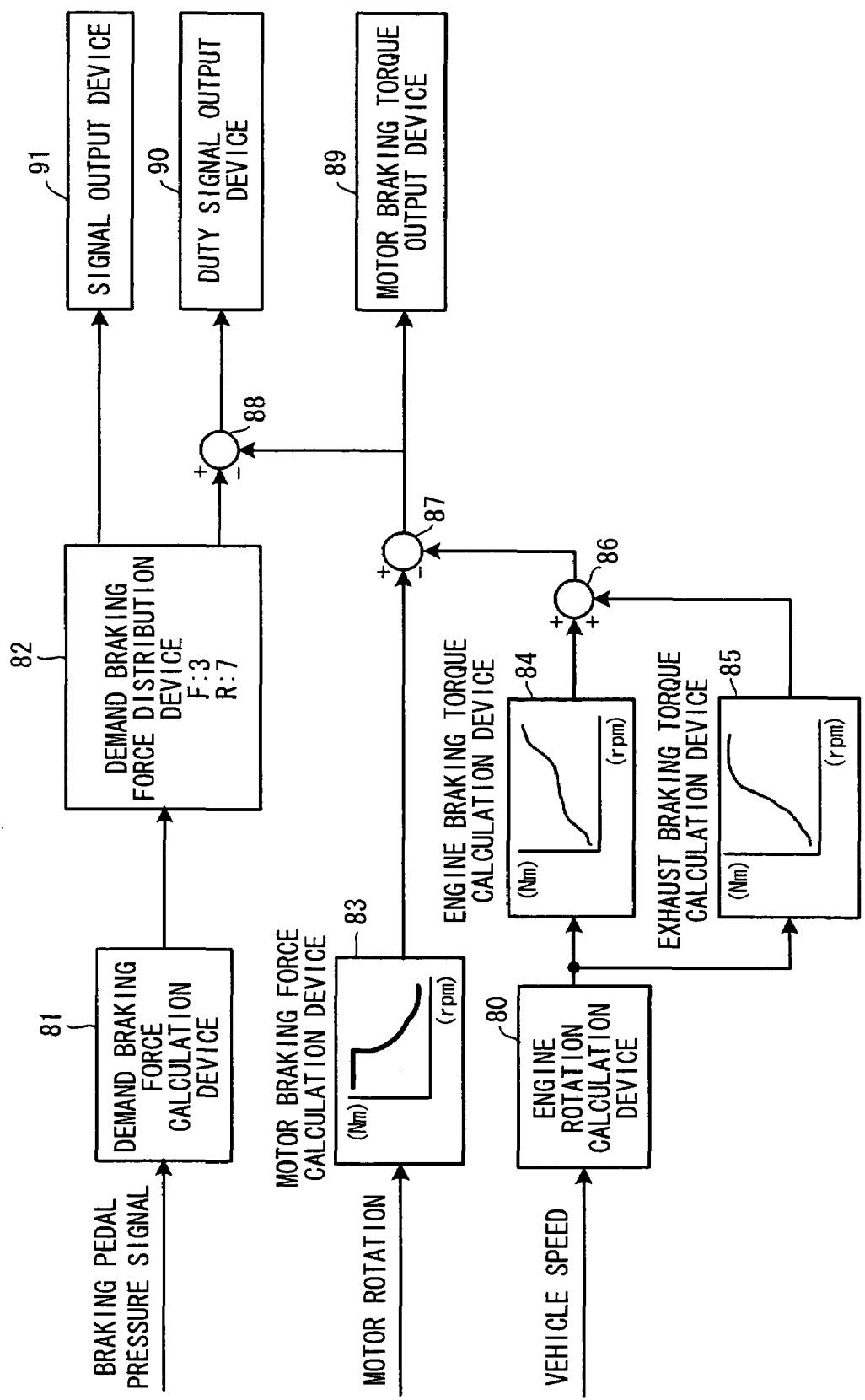
FIG. 6 is a control block diagram distributing a braking force of the embodiment.

FIG. 6 is a calculation block diagram showing control contents performed in the vehicle control unit 20 for distributing the above-described braking force.

FIG. 6 shows a demand braking force calculation circuit section 81 which calculates a demand deceleration energy in response to a braking pedal pressure detected by braking pressure sensors 59, 69 and a demand braking force distribution circuit section 82 which distributes the calculated demand deceleration energy to the front wheel 6 and the rear wheel 7 a distribution ratio of which is substantially 3 to 7.

And a braking force calculation section 83 which calculates a motor braking force generating in response to a rotation speed of the motor 2 is provided.

Further, a rotation speed calculation circuit section 80 calculating an engine rotation speed based upon a vehicle speed, an engine braking calculation circuit section 84 calculating an engine braking force generating in response to an engine rotation speed, and an exhaust braking force calculation circuit section 85 calculating an exhaust braking force in response to an engine rotation speed are provided, and these engine braking force and exhaust braking force are added in an addition circuit section 86.

And a subtracter 87 subtracting an addition value of the engine braking force and the exhaust braking force from the motor braking force of the motor braking force calculation circuit section 83 is provided, and a motor braking torque output circuit section 89 outputs this subtracted value as a motor braking torque.

And a subtracter 88 subtracting the motor braking torque from the demand braking force distributed to the rear wheel 7 by the demand braking force distribution circuit section 82 is provided, and a duty signal is outputted to the rear wheel proportional valve 63 from a duty signal output circuit section 90 outputting a duty signal in response to the subtracted value, and further, a duty signal is outputted to the front wheel proportional valve 53 from a duty signal output circuit section 91 outputting a duty signal in response to a demand braking force distributed to the front wheel 6.

Figure 7:
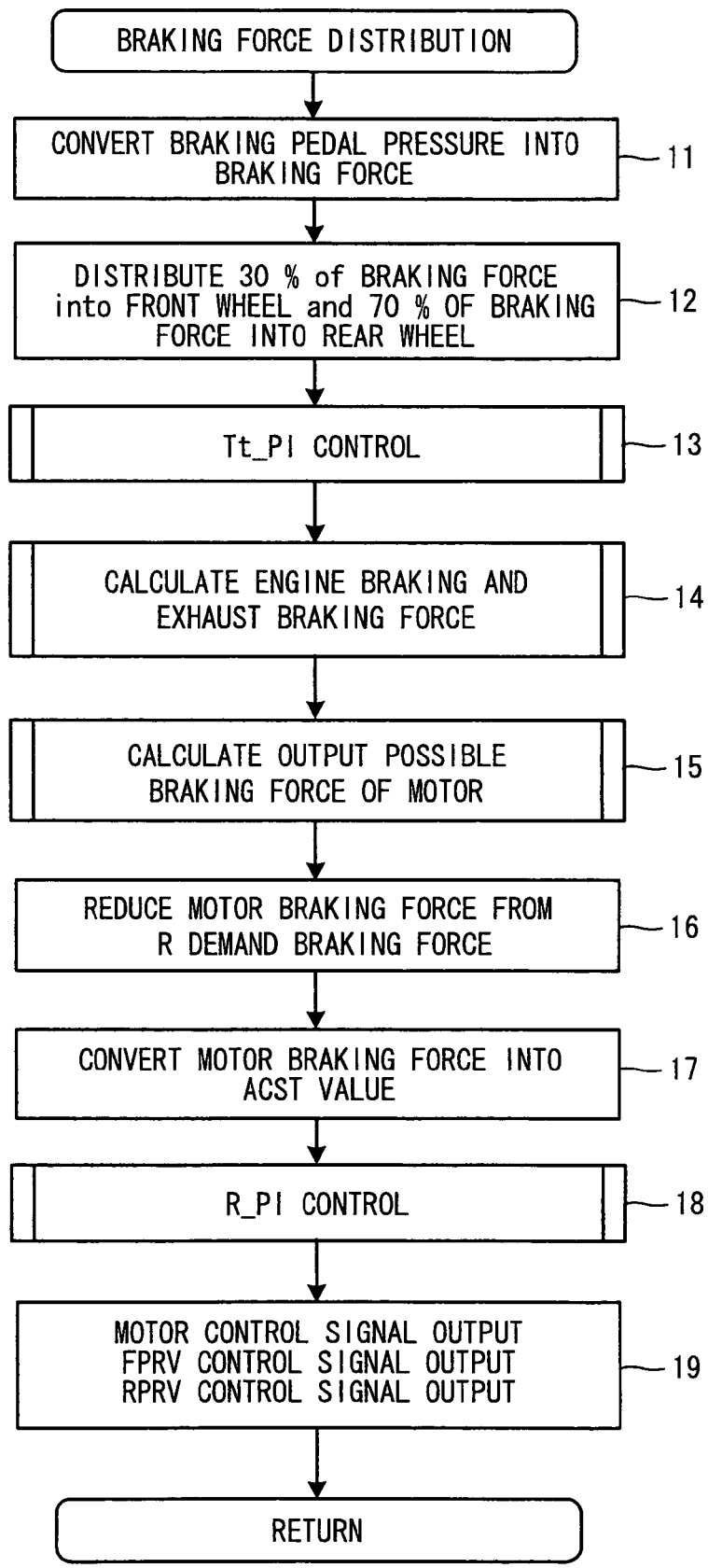
FIG. 7 is a flow chart showing a control content distributing the braking force of the embodiment.

A flow chart in FIG. 7 shows a control routine distributing the above-described braking force.

First the demand braking force is calculated based upon the demand deceleration energy (braking energy) corresponding to the braking pedal pressure detected by the braking pressure sensors 59, 69. The process goes to step 12, wherein the calculated demand braking force is distributed to the front wheel 6 and the rear wheel 7 in a ratio of substantially 3 to 7.

Figure 8:
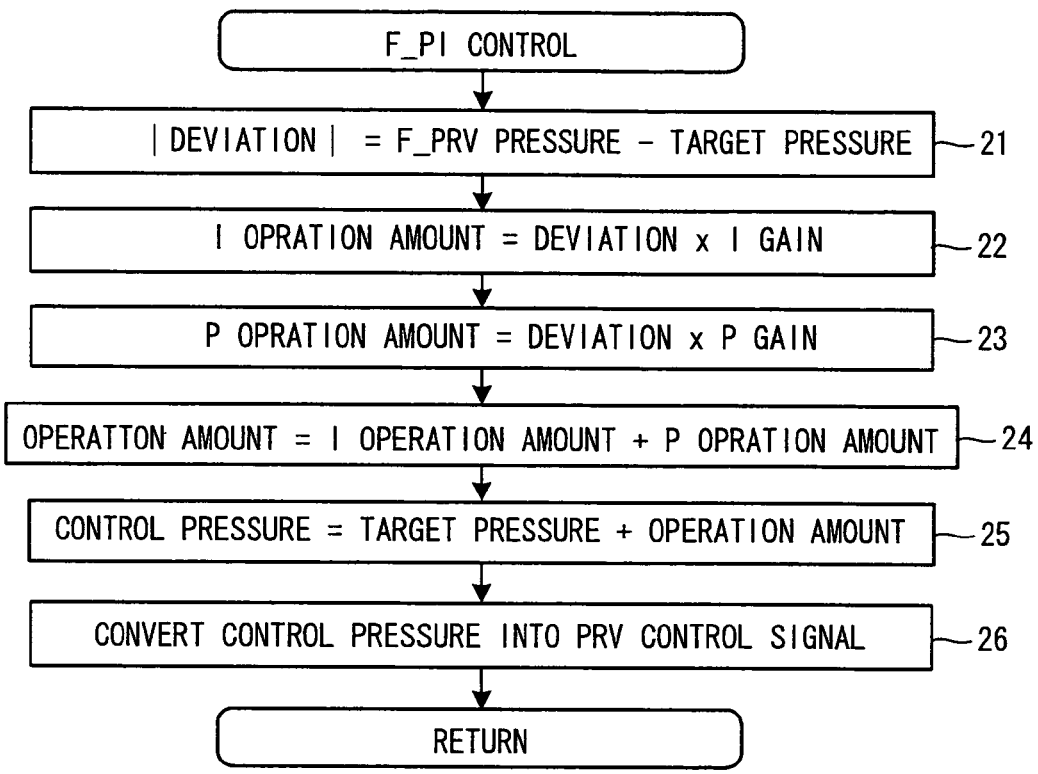
FIG. 8 is a flow chart showing a control content of a front wheel proportional valve.

Thereafter, the process goes to step 13, wherein steps 21-26 shown in a subroutine of FIG. 8 are performed and thereby, a control pressure of the front wheel proportional valve 53 is calculated by PI control so as to obtain a control pressure in response to the demand braking force distributed to the front wheel 6.

Namely in step 21 a deviation between the front wheel-side proportional control pressure and a target pressure is extracted, in step 22 an integral operation amount I is extracted by multiplying the deviation over an integral gain, and further, in step 23 a proportional operation amount P is extracted by multiplying the deviation over a proportional gain. In step 24 an operation amount is extracted by adding the integral operation amount I to the proportional operation amount P, in step 25 a control pressure is calculated by adding the target pressure to the operation amount, and in step 26 the control pressure is extracted by being converted into the control pressure of the proportional pressure.

Next, the process goes to step 14 in FIG. 7, wherein a braking force is calculated by adding the engine braking force to the exhaust braking force, which is calculated by performing the subroutines in FIGS. 10 and 11 to be described later.

Next, the process goes to step 15, wherein an output possible braking force of the motor 2 is calculated, and next in step 16 the motor braking force is subtracted from the demand braking force distributed to the rear wheel 7. Then, the process goes to step 17, wherein the motor braking force is converted into a torque command value ACST of the motor 2. The process goes to step 18, wherein steps 31-36 in a subroutine shown in FIG. 9 are performed and thereby a control pressure of the rear wheel proportional valve 63 is controlled by PI control so that a target pressure corresponding to the demand braking force distributed to the rear wheel 7 can be obtained.

Figure 9:
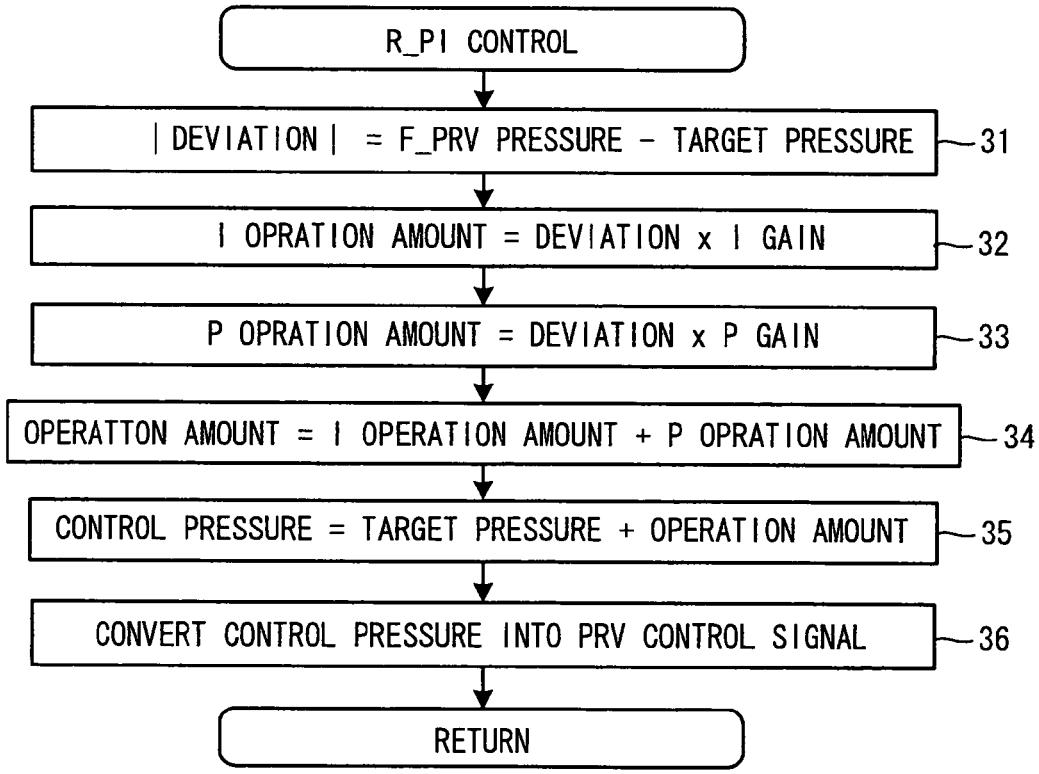
FIG. 9 is a flow chart showing a control content of a rear wheel proportional valve.

The subroutine in FIG. 9 is substantially the same as the subroutine in FIG. 8, wherein the steps 31-36 in FIG. 9 correspond to the steps 21-26, which differ only in that a control object is a control signal of the proportional pressure of the rear wheel side from the steps in FIG. 8. Accordingly a detailed explanation in FIG. 9 is omitted in reference to FIG. 8.

Then, the process goes to step 19, wherein control signals of the motor 2, the front wheel proportional valve 53, and the rear wheel proportional valve 63 are outputted.

Figure 10:
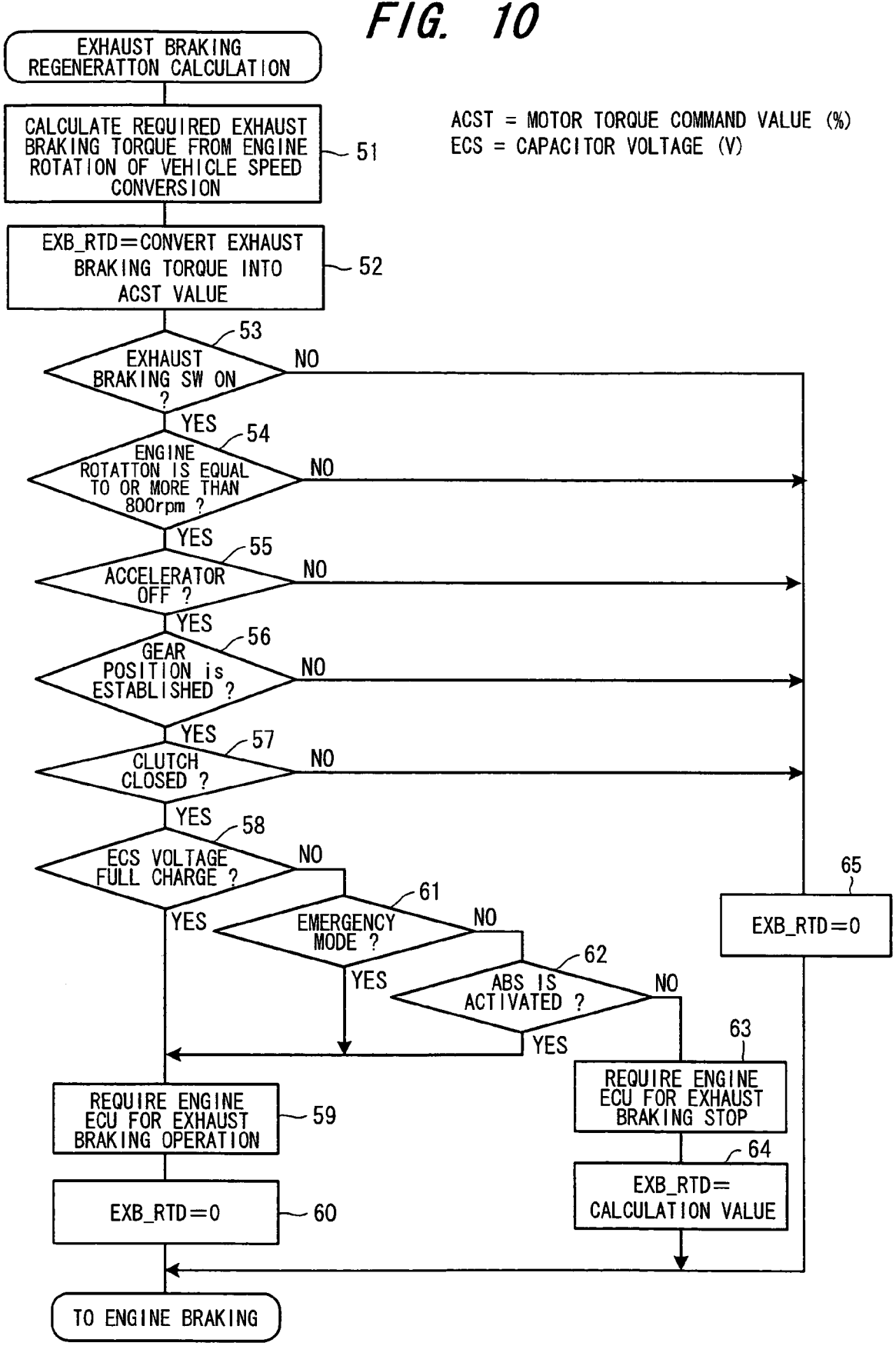
FIG. 10 is a flow chart showing a control content of a regenerative exhaust brake.

A flow chart in FIG. 10 shows a routine controlling an operation of the exhaust brake 27.

First in step 51 a required exhaust braking torque value EXB is calculated from an engine rotation of a vehicle speed conversion. In step 52 the exhaust braking torque value EXB is converted into the torque command value ACST of the motor 2. Then the process goes to step 53, wherein it is judged whether or not it is a regenerative exhaust braking time when the exhaust braking switch 26 is on.

When the exhaust braking switch 26 is on, the process goes to step 54, wherein it is judged whether or not an engine rotation number is equal to or more than 800 rpm. When the engine rotation number is equal to or more than 800 rpm, the process goes to step 55, wherein it is judged that an accelerator is off. When it is judged that the accelerator is off, the process goes to step 56, wherein it is judged whether or not a gear position of the transmission 4 is established.

When the gear position is established, the process goes to step 57, wherein it is judged whether or not the engine clutch 3 is connected. When the engine clutch 3 is connected, the process goes to step 58, wherein it is judged whether or not a charging voltage of the capacitor (ECS) 16 is in a full charging state exceeding a predetermined value.

When the capacitor 16 is in a full charging state, the process goes to step 59, wherein a command is given to the engine control unit 10 for operating the exhaust brake 27, and in step 60 an exhaust braking torque value EXB is set as zero.

On the other hand, in step 58 when it is judged that the capacitor 16 is not in a full charging state, the process goes to step 61, wherein when it is judged that the emergency switch 28 is off. When it is in an emergency mode, the process goes to a step after step 59, wherein the exhaust braking operation the same as the above is performed.

On the other hand, when it is not in the emergency mode, the process goes to step 62, wherein it is judge that an ABS modulator is not operating. Namely it is confirmed that an anti-braking control is not performed.

In case these conditions all are met, the process goes to step 63, wherein a command to stop the exhaust brake 27 is given to the engine control unit 10 and in step 64 the exhaust braking torque value EXB is set as a calculation value for the regenerative power generation by the motor 2.

And in case one of the conditions in steps 53-57 is not met, in step 65 the exhaust braking torque value EXB is set as zero and the exhaust brake 27 is adapted to be operated, not the regenerative power generation by the motor 2.

Figure 11:
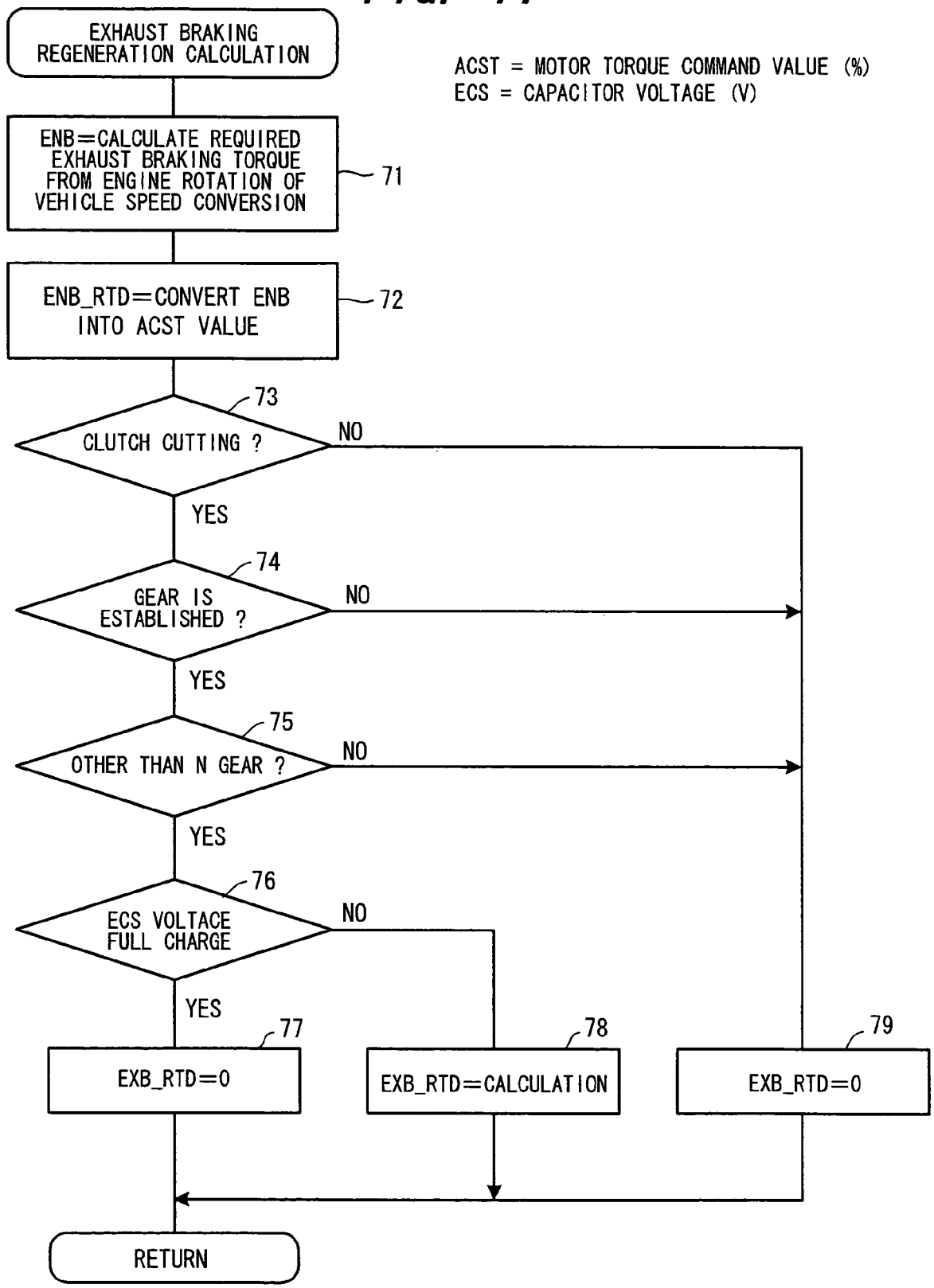
FIG. 11 is a flow chart showing a control content of a regenerative engine brake.

Next, a flow chart in FIG. 11 shows a routine controlling an operation of an engine braking.

First in step 71 a required engine braking torque value ENB is calculated from an engine rotation speed converted from the vehicle speed. The process goes to step 72, wherein the engine braking torque value ENB is converted into the torque command value ACST corresponding to the regenerative torque by the motor 2.

The process goes to step 73, wherein it is judged whether or not the engine clutch 3 is disconnected. When the clutch is not connected, the process goes to step 74, wherein it is judged whether or not a gear position of the transmission 4 is established. When the gear position is established, the process goes to step 75, wherein it is judged that a gear position is not in a neutral position. In case these conditions all are met, the process goes to step 76, wherein it is judged whether or not the capacitor 16 is in a full charging state.

If in step 76 the capacitor 16 is in a full charging state, in step 77 the engine braking torque value ENB is set as zero and the regenerative power generation by the motor 2 is not performed.

On the other hand, when it is judged that the capacitor 16 is not in a full charging state, the process goes to step 78, wherein the engine braking torque value ENB is set as a calculation value for the regenerative power generation by the motor 2.

And in case one of these conditions in steps 73-75 is not met, in step 79 the engine braking torque value ENB is set as zero and the regenerative power generation by the motor 2 is not performed.

Figure 12:
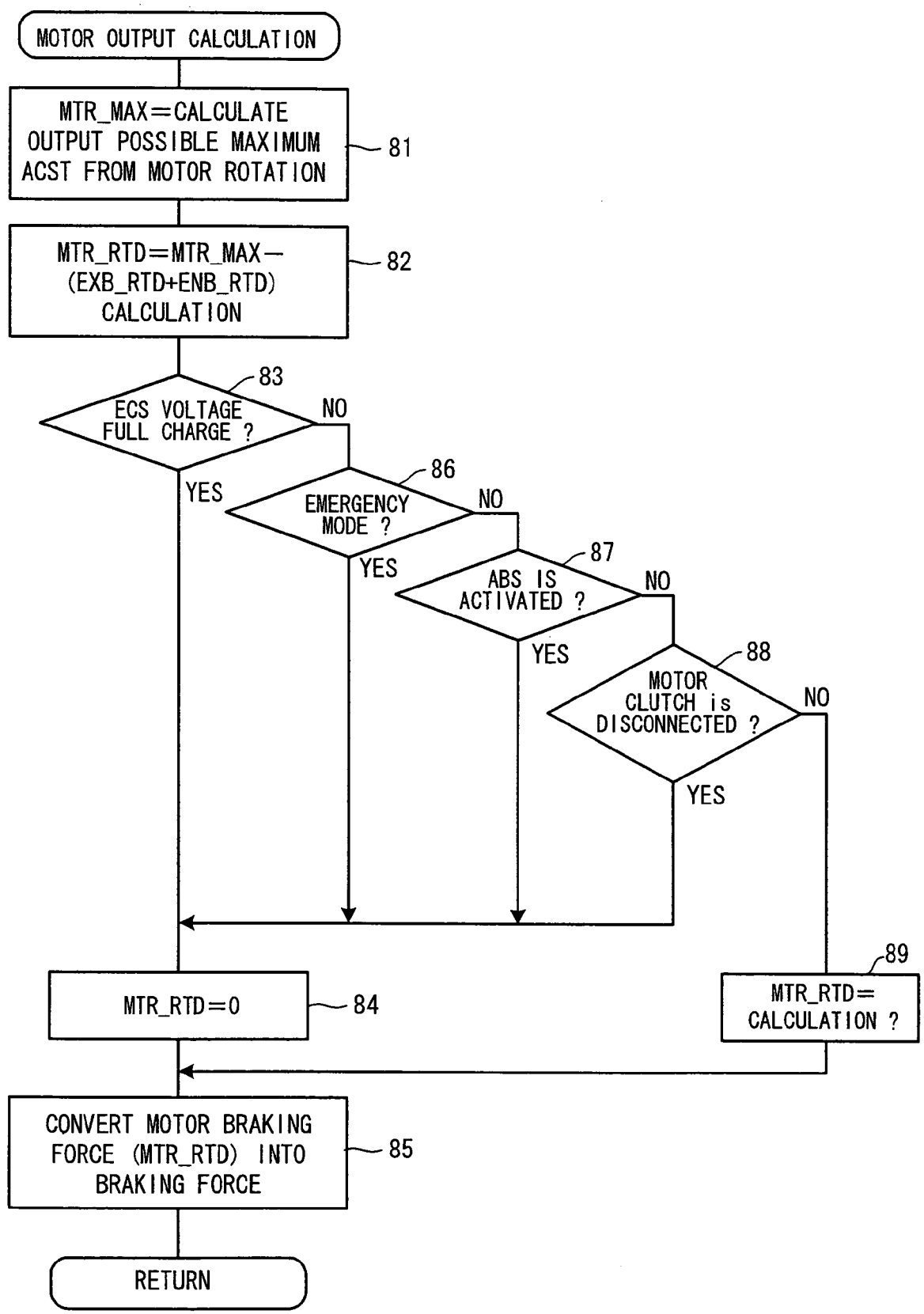
FIG. 12 is a flow chart showing a control content of a regenerative power generation of a motor.

Further, a flow chart in FIG. 12 shows a routine controlling the regenerative power generation of the motor 2.

First a maximum torque command value MTR-MAX is calculated based upon an output possible maximum motor torque value ACST from a rotation speed of the motor 2 in step 81. The process goes to step 82, wherein the motor braking torque value MTR-RTD is calculated by subtracting the exhaust braking torque value EXB and the engine braking torque value ENB calculated as the above from the maximum torque command value MTR-MAX.

Then the process goes to step 83, wherein it is judged whether or not the capacitor 16 is in a full charging state. When the capacitor 16 is in a full charging state, the process goes to step 84, wherein the motor braking torque value MTR is set as zero. Namely the motor regenerative power generation stops.

On the other hand, it is judged that the capacitor 16 is not in a full charging state, the process goes to step 86, wherein it is judged that the emergency switch 28 is off, the process goes to step 87, wherein it is judged that the ABS modulator is not operating, further the process goes to step 88, wherein it is judged that the engine clutch 3 is not disconnected.

In case these conditions all are not met, the process goes to step 89, wherein the motor braking torque command value MTR-RTD calculated above is set to the engine control unit 10 for operating the regenerative power generation by the motor 2.

On the other hand, in case one of these conditions in steps 86-88 is met, in step 84 the motor braking torque value MTR is set as zero. Finally the process goes to step 85, wherein the braking torque value MTR-RTD is converted into the braking force.

Thus at a braking time when the braking pedal is depressed, the regenerative power generation by the motor 2 is performed as long as a predetermined condition is met, thereby to produce a braking force of the rear wheel side.

Figure 13:
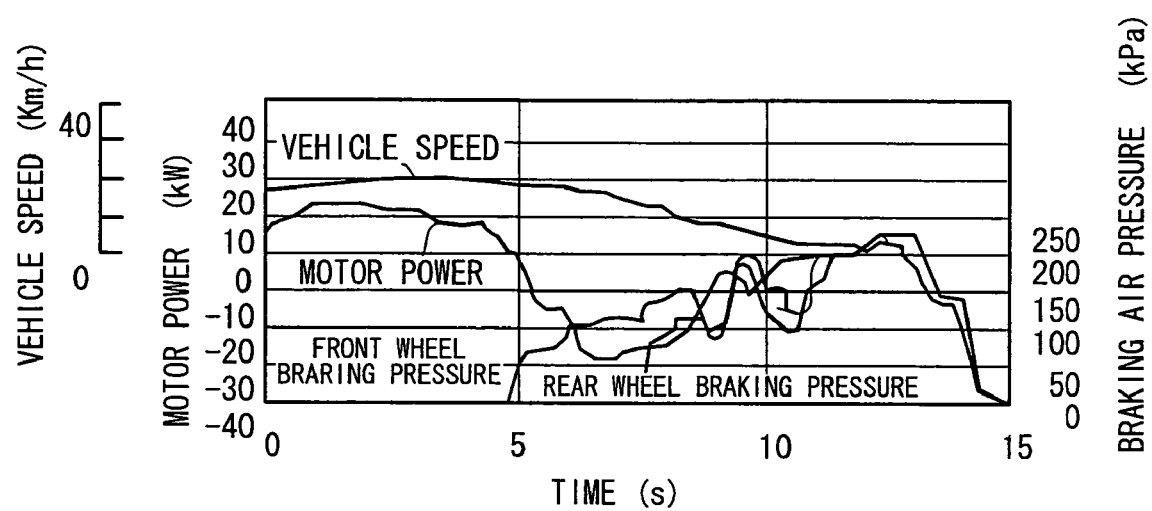
FIG. 13 is a time chart showing a braking control state by a braking force distribution.

FIG. 13 is a time chart showing a control example where the braking force is distributed as described above.

Since travel of a vehicle is performed by the motor 2, the motor 2 is consuming the power. When the braking pedal is depressed in the vicinity of time (5), a motor consumption power changes into a negative side to perform the regenerative power generation by the motor 2. Thereby a braking force of the rear wheel side is produced. At the same time a braking pressure of the front wheel side increases where a braking force distribution between the front wheel side and the rear wheel side is set to be in a ratio of 3 to 7 as described above.

The vehicle speed reduces as a result of starting the braking. The motor regenerative energy also reduces due to the reduction of the vehicle speed and as a result, the motor regenerative energy is not sufficient as the rear wheel-side deceleration energy required (braking energy), and therefore, the rear wheel-side braking force is generated at that point. Thereby the braking force of the rear wheel side is produced by the motor 2 and the rear wheel-side braking actuator.

When the vehicle stops completely in the vicinity of time (10), and thereafter the braking pedal is released, the braking force of the front wheel side and the rear wheel side is lowered to zero and the motor power is also reduced to zero.

Since thus the distribution of the braking force is performed, the required braking energy is generated by the regenerative power generation by the motor 2, and the front wheel-side and the rear wheel-side actuator to certainly generate the required braking torque. And then since the braking force between the front wheel side and rear wheel side is distributed properly, a stable braking can be performed without slip of a vehicle even on a slippery road such as a frozen road.

Further, in case in the above-described automatic braking control the vehicle speed is reduced to a extremely low value, for example, a speed of less than 3-5 km due to the braking, the vehicle control unit 20 stops the automatic braking control and can return the braking system back to a manual braking control.

Figure 14:
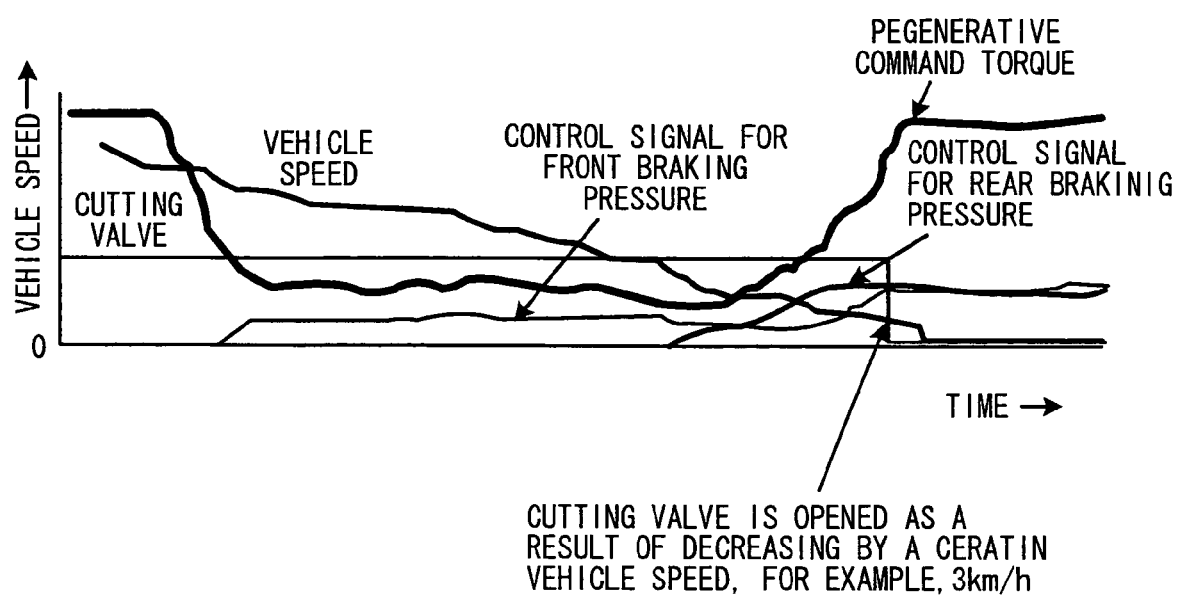
FIG. 14 is a time chart showing a control content to lift an automatic braking control in an extremely low speed of a vehicle.

FIG. 14 is a time chart where when a vehicle speed is, for example, equal to or more than 3 km during deceleration of a vehicle travel, a braking air pressure is controlled by the proportional valves 53, 63 and as described above, the motor regenerative power generation and the automatic braking control of the front wheel-side and the rear wheel-side braking pressure are performed.

Thereafter, when the vehicle speed is gradually reduced to, for example, equal to or less than 3 km, the cutting valves 52, 62 are opened and in this condition the braking air pressure control by the proportional valves 53, 63 are stopped. Therefore, the braking control is switched into a manual braking control by the braking valve 41.

Thus during the vehicle travel in an extremely low speed equal to or less than 3-5 km, a manual braking control is performed, not an automatic braking control, and thereby the braking force can be controlled accurately with a braking operation by a driver, to avoid damage of a braking feeling.

The present invention is not limited to the described embodiments and it is apparent for those skilled in the art that various modifications and changes can be made within the scope of the technical spirit of the present invention.

INDUSTRIAL APPLICATION

The present invention can be applied to a braking device of a hybrid vehicle.

The invention claimed is:

1. A braking system for a hybrid vehicle including
an engine, a motor, and an accumulator to accumulate an electric power which drives the motor, comprising:
a vehicle driving wheel to which rotation of the motor is transmitted;
a vehicle driven wheel;
a braking actuator which brakes the driving and driven wheels;
a control device which changes a braking force of the ζbraking actuator respectively for the driving and driven wheels; and
a controller for braking, wherein:
the controller calculates a braking energy required based upon a vehicle operating condition in demanding a braking and controls the motor to generate a regenerative power thereof so as to produce the calculated braking energy, as well as controls a braking force of the driven wheel; and
wherein the controller distributes the braking force generated in the driving wheel and the driven wheel in demanding the braking so that a distribution ratio of the braking force is substantially 7 to 3.

2. The braking system for the hybrid vehicle as defined in claim 1, wherein:
the controller generates a driving force by the braking actuator of the driving wheel when the braking force of the driving wheel by the motor does not meet the ratio.

3. The braking system for the hybrid vehicle as defined in claim 2, wherein:
the controller, when a vehicle speed is less than a predetermined value during vehicle deceleration, distributes the braking force in the driving wheel and the driven wheel so that a distribution ratio of the braking force is substantially 5 to 5.

4. The braking system for the hybrid vehicle as defined in claim 2, wherein:
the controller, when a vehicle travels in an extremely low speed less than a predetermined value in braking the vehicle, stops a distribution control of the braking force.

5. The braking system for the hybrid vehicle as defined in claim 1, wherein:
the controller, when it is judged that the accumulator is in a full charging state, stops the regenerative power generation by the motor and generates the braking force in the driving wheel and driven wheel based upon an operation of the braking actuator.

6. The braking system for the hybrid vehicle as defined in claim 1, wherein:
the braking demand is detected based upon an operation of a braking pedal.

* * * * *